US012047276B2

(12) United States Patent
Amend et al.

(10) Patent No.: US 12,047,276 B2
(45) Date of Patent: Jul. 23, 2024

(54) METHOD AND COMMUNICATION DEVICE FOR TRANSMITTING MULTIPLE DATA STREAMS OF DIFFERENT COMMUNICATION SERVICES OVER A MULTIPATH TRANSMISSION SYSTEM

(71) Applicant: DEUTSCHE TELEKOM AG, Bonn (DE)

(72) Inventors: Markus Amend, Nidda (DE); Eckard Bogenfeld, Carlsberg (DE)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 17/763,239

(22) PCT Filed: Oct. 9, 2020

(86) PCT No.: PCT/EP2020/078440
§ 371 (c)(1),
(2) Date: Mar. 24, 2022

(87) PCT Pub. No.: WO2021/069678
PCT Pub. Date: Apr. 15, 2021

(65) Prior Publication Data
US 2022/0393970 A1 Dec. 8, 2022

(30) Foreign Application Priority Data

Oct. 10, 2019 (EP) .................................... 19202482

(51) Int. Cl.
*H04L 45/24* (2022.01)
*H04L 45/302* (2022.01)
*H04L 69/14* (2022.01)

(52) U.S. Cl.
CPC ............ *H04L 45/24* (2013.01); *H04L 45/306* (2013.01); *H04L 69/14* (2013.01)

(58) Field of Classification Search
CPC ....... H04L 45/24; H04L 45/306; H04L 69/14; H04L 47/24; H04L 47/2433; H04L 47/2441; H04L 67/61
See application file for complete search history.

(56) References Cited

U.S. PATENT DOCUMENTS

2022/0311746 A1* 9/2022 Boucadair ........... H04L 63/0884

FOREIGN PATENT DOCUMENTS

| EP | 3 522 479 A1 | 8/2019 |
| EP | 3544332 B1 | 5/2021 |

(Continued)

OTHER PUBLICATIONS

A. Ford et al., "TCP Extensions for Multipath Operation with Multiple Addresses", Internet Engineering Task Force (IETF), RFC No. 6824, Jan. 2013, [p. 1-64].

(Continued)

*Primary Examiner* — Justin T Van Roie
(74) *Attorney, Agent, or Firm* — Leydig, Voit & Mayer, Ltd.

(57) ABSTRACT

A method for transmitting multiple data streams of different communication services over a multipath transmission system includes: providing data to be transmitted, wherein the data to be transmitted comprises first data and second data; detecting, out of a plurality of communication services, a first communication service the first data belongs to and a second communication service the second data belongs to; mapping the first data to a first data stream and the second data to a second data stream based on the first and second detected communication services; scheduling transfer of the first data stream and the second data stream based on the first classification parameter assigned to the first and second communication services; and scheduling transmission of the first data and the second data to the destination communi- (Continued)

cation device based on the at least one second classification parameter assigned to the first and second communication services.

12 Claims, 2 Drawing Sheets

(56) References Cited

FOREIGN PATENT DOCUMENTS

| EP | 3579500 B1 | 11/2021 |
|---|---|---|
| GB | 2525416 A | 10/2015 |
| WO | WO 2019162210 A1 | 8/2019 |

OTHER PUBLICATIONS

Q. Coninck et al., "Multipath Extensions for QUIC (MPQUIC)", draft-deconinck-quic-multipath-02, Internet Engineering Task Force (IETF), Internet-Draft, Mar. 7, 2019, [p. 1-30].

P. Amer et al., "Load Sharing for the Stream Control Transmission Protocol (SCTP)", draft-tuexen-tsvwg-sctp-multipath-17, Internet Engineering Task Force (IETF), Internet-Draft, Jan. 18, 2019, [p. 1-29].

M. Amend et al., "DCCP Extensions for Multipath Operation with Multiple Addresses", draft-amendtsvwg-multipath-dccp-01, Internet Engineering Task Force (IETF), Internet-Draft, Mar. 11, 2019, [p. 1-9].

N. Leymann et al., "Hybrid Access Network Architecture", draft-lhwxz-hybrid-accessnetwork-architecture-02, Internet Engineering Task Force (IETF), Internet-Draft, Jan. 14, 2015, [p. 1-15].

TR-348 "Hybrid Access Broadband Network Architecture", BBR Specification, Jul. 2016, [p. 1-49].

3GPP Specification: TR 23.793, "3rd Generation Partnership Project; Technical Specification Group Services and System Aspects; Study on access traffic steering, switch and splitting support in the 5G system architecture", (Release 16), Version 16.0.0, Dec. 29, 2018, [p. 1-114], Sophia Antipolis, France, http://www.3gpp.org.

R. Hamilton et al., "QUIC: A UDP-Based Secure and Reliable Transport for HTTP/2", draft-tsvwg-quic-protocol-02, Internet Engineering Task Force (IETF), Internet-Draft, Jan. 13, 2016, [p. 1-37].

R. Stewart, "Stream Control Transmission Protocol", RFC No. 4960, Sep. 2007, [p. 1-152].

W. Lu et al., "PO-MPTCP: Priorities-Oriented Data Scheduler for Multimedia Multipathing Services," International Journal of Digital Multimedia Broadcasting, Dec. 2, 2018, 9 pages, vol. 2018, Article ID 1413026, Nanchang, China.

* cited by examiner

METHOD AND COMMUNICATION DEVICE FOR TRANSMITTING MULTIPLE DATA STREAMS OF DIFFERENT COMMUNICATION SERVICES OVER A MULTIPATH TRANSMISSION SYSTEM

CROSS-REFERENCE TO PRIOR APPLICATIONS

This application is a U.S. National Phase application under 35 U.S.C. § 371 of International Application No. PCT/EP2020/078440, filed on Oct. 9, 2020, and claims benefit to European Patent Application No. EP 19202482.6, filed on Oct. 10, 2019. The International Application was published in English on Apr. 15, 2021 as WO 2021/069678 A1 under PCT Article 21(2).

TECHNICAL FIELD

The invention relates to a method for transmitting multiple data streams of different communication services over a multipath transmission system and a communication device for transmitting multiple data streams of different communication services.

BACKGROUND

One major task of multimedia communication systems is to transmit efficiently multimedia data traffic from a source to a destination. Therefore, network protocols are developed to achieve a high performance in efficiently transmitting multimedia data traffic.

There exist several multipath protocols like MPTCP (Multipath Transmission Control Protocol) standardized by IEFT in RFC 6824, January 2013, CMT-SCTP described by P. Amer et al. in the document "Load Sharing for the Stream Control Transmission Protocol (SCTP), draft-tuexen-tsvwg-sctp-multipath-18, Jul. 22, 2019" and MP-DCCP as disclosed in EP 3 522 479 A1.

A priorities-oriented data scheduler for multimedia multipathing services is described in Wei Lu, Dandan Yu, Minghe Huang, and Bin Guo, "PO-MPTCP: Priorities-Oriented Data Scheduler for Multimedia Multipathing Services," International Journal of Digital Multimedia Broadcasting, vol. 2018, Article ID 1413026, 9 pages, 2018. https://doi.org/10.1155/2018/1413026. In this paper a MPTCP-based path scheduler is described which distinguishes relatively prioritized data to ensure that higher-priority data can be transmitted via a good quality path.

SUMMARY

In an exemplary embodiment, the present invention provides a method for transmitting multiple data streams of different communication services over a multipath transmission system. The method includes the following steps: a) assigning to each communication service of a plurality of communication services a predefined set of classification parameters, wherein each predefined set of classification parameters comprises a first classification parameter and at least one second classification parameter, wherein the first classification parameter is a priority value; b) providing, at a communication device configured to transmit data traffic to a destination communication device, data to be transmitted, wherein the data to be transmitted comprises first data and second data; c) detecting, out of the plurality of communication services, a first communication service the first data belongs to and a second communication service the second data belongs to; d) mapping, by the communication device, the first data to a first data stream and the second data to a second data stream based on the first and second detected communication services; e) scheduling, by the communication device, transfer of the first data stream and the second data stream based on the first classification parameter assigned to the first and second communication services; and f) scheduling, by the communication device, transmission of the first data and the second data to the destination communication device based on the at least one second classification parameter assigned to the first and second communication services.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Exemplary embodiments of the present invention provide a method and a communication device for transmitting multiple data streams each carrying a different communication service in a flexible way over a multipath communication link.

In an embodiment, a service based multipath decision function is integrated in the communication device which combines data stream scheduling with path scheduling. In particular, communication services are relatively prioritized against each other and path selection, path aggregation and path order rules can be flexibly implemented in response to the prioritized communication services.

Figure 1:
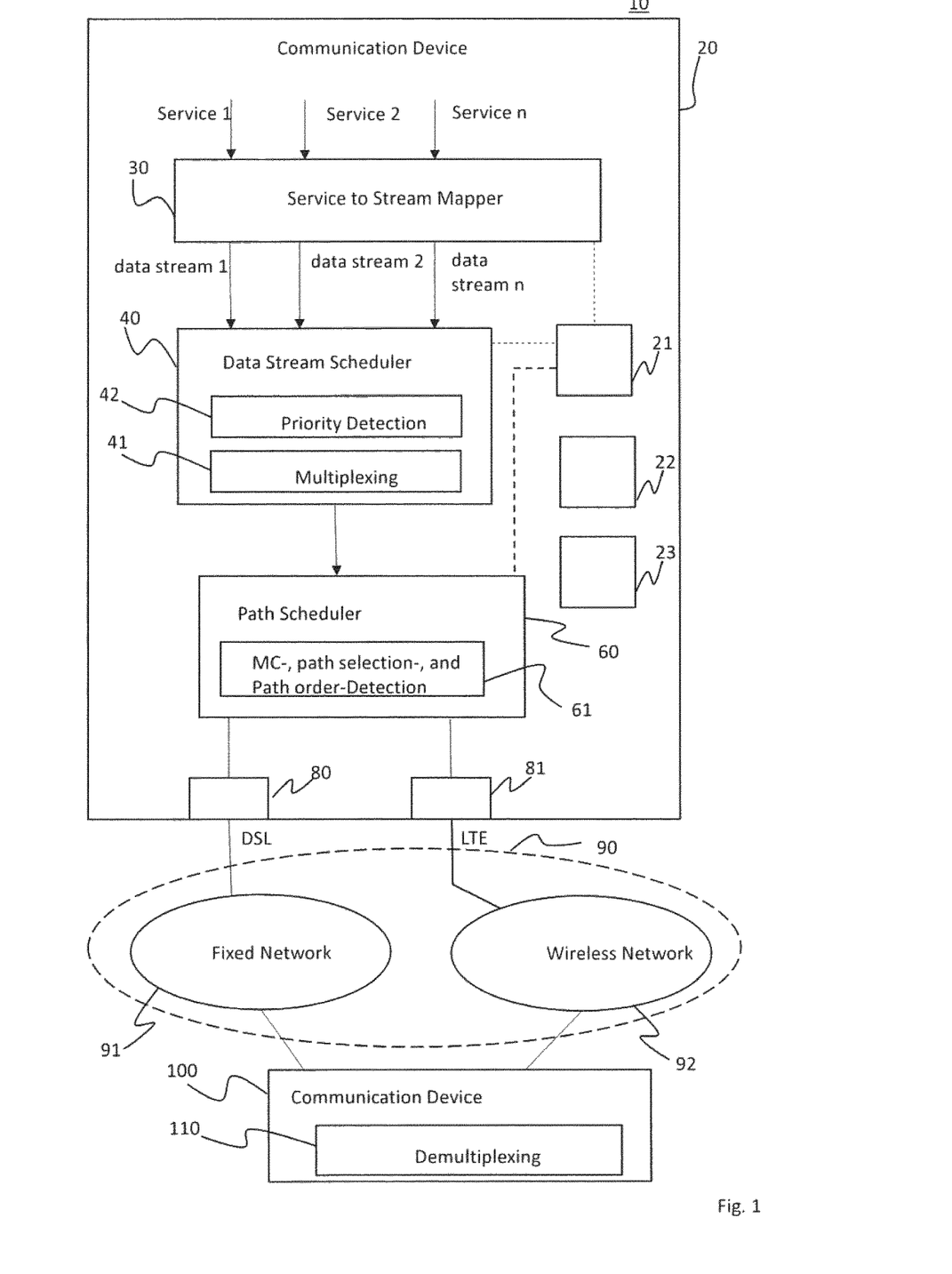
FIG. 1 depicts an exemplary multipath transmission system.
Figure 2:
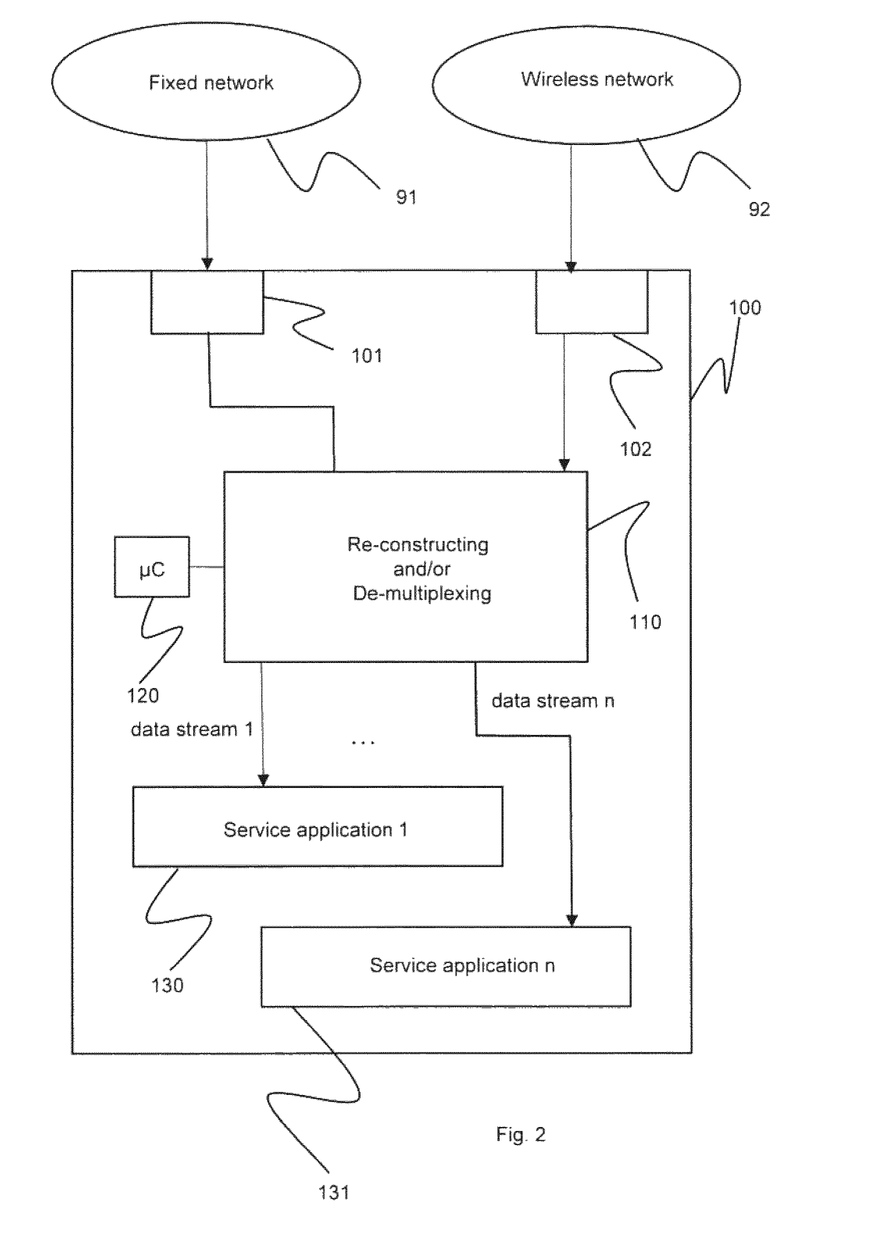
FIG. 2 depicts an exemplary destination communication device.

A preferred embodiment is now described in detail in conjunction with FIG. 1 and FIG. 2.

FIG. 1 depicts an exemplary multipath transmission system 10, which allows in particular multiple user messages, i.e. multiple data streams of different services to be transmitted each via a single path or multiple paths of a connection established according to a multi-stream capable network protocol between a communication device 20 operating as a sending device and a destination communication device 100 operating as a receiving device. In other words, each data stream of the multiple data streams can be transmitted over one or more of the multiple paths of the connection in dependence of an individual decision of a path scheduler 60. It should be noted that data transmitted in a data stream are preferably transmitted in IP data packets, wherein each data packet of a data stream may include respective priority value, a data stream identifier and a data stream specific multipath information indicating in particular the path or the paths of the connection the respective data stream is to be transmitted. The data stream identifier and the specific multipath information can be used by the destination device 100 to process, e.g. to re-construct a respective data stream transmitted over at least two paths of the connection. In addition, the destination communication device 100, which is exemplary depicted in FIG. 2, may be configured to process the data streams, e.g. to forward the received data streams and, if necessary, re-constructed data streams to respective service destinations 130, 131, i.e. service applications 1 to n, preferably in dependence of the priority values associated with each data stream. It should be noted that the n service applications 130 and 131 can be alternatively implemented outside of the communication device 100, for example in an external application server. In this case, the communication device 100 is configured to communicate with the application server. The destination device 100 may be implemented at an Internet provider system. It should be noted that the communication device 20 and the communication device 100 constitute a respective end point of the connection established therebetween. In other words, this connection terminates the multi-stream capable network protocol at the communication device 10 and at the communication device 200.

One aspect of the present invention is to transmit user messages each associated with a communication service by using a combination of a data stream scheduling module 40 and the path scheduling module 60, which are triggered each by different communication service classification parameters. The communication device 20 may be realized by a mobile phone, a fixed line terminal or by any other user equipment. The destination communication device 100 can be realized by a single hardware server or a computer network or a mobile phone as well. It should be noted that the communication device 20 can be further configured to function as a receiving device similar to communication device 100, wherein communication device 100 can be further configured to function as a sending device similar to communication device 20. This means that both communication device 20 and communication device 100 can be similar or identically implemented.

As exemplarily shown in FIG. 1, communication device 20 and destination device 100 can communicate via a hybrid access network 90 which may comprise a LTE based wireless network 92 and a DSL-based fixed network 91, each configured to transmit for example IP packets. Hybrid access networks are known and described for example in "broadband forum, TECHNICAL REPORT, TR-348 Hybrid Access Broadband Network Architecture, Issue: 1, Issue Date: July 2016" and in EP 3 522 479 A1. It should be noted that a connection, i.e. a communication link, which may comprise at least two communication paths, can be established over the hybrid access network 90 between the communication device 20 and the destination communication device 100. For example, a first communication path can be led from the communication device 20 over the fixed network 91 to the communication device 100 and a second communication path can be led from the communication device 20 over the wireless network 92 to the communication device 100 for transmitting multiple data streams of different communication services from the communication device 20 to the communication device 100 or vice versa.

In order to get access to the hybrid access network 90, the communication device 20 may comprise two different access interface components 80 and 81. The access interface component 80 may be a DSL based interface component to enable access to the fixed network 91, wherein the access interface component 81 may be a LTE based interface component adapted to enable an access to the wireless network 92. For the sake of a better understanding, it is assumed that the access interface components 80 and 81 support only one transmission, i.e. communication path, respectively. However, it should be noted that each access interface component 80 and 81 can support a plurality of communication paths which may be used for example simultaneously during a communication session between the communication device 20 and the communication device 100 to split multiple data streams generated according to a multi-stream capable network protocol across multiple communication paths, wherein each of the multiple data streams may carry a different communication service.

Preferably, a multi-stream capable network protocol, which comprises the data stream scheduling module 40 and the path scheduling module 60, may be implemented in the communication device 20 and can be controlled by a control unit 21 of the communication device 20. The network protocol can be based on a multi-stream capable network protocol like SCTP (Stream Control Transmission Protocol) or a QUIC (Quick UDP Internet Connections) network protocol which can be used by the control unit 21 to perform a method for transmitting multiple data streams of different communication services over at least one communication path of a connection established between the communication device 20 and the communication device 100 using in combination the data streaming scheduling module 40 and the path schedule module 60 in connection with service based multipath decisions. In other words, the communication system 10 and in particular the communication device 20 is adapted to support a multipath traffic distribution concept combining stream and path scheduling for a service differentiated transmission. This means that each data stream of the multiple data streams within the multi-stream network protocol carrying the different communication services can be transmitted over one or more communication paths of the connection established between the communication device 20 and the communication device 100 in dependence of a data stream and multipath specific policy used by the data stream scheduler 40 and the path scheduler 60, respectively.

The communication device 20 is adapted to provide multiple user messages 1 to n, i.e. first data, second data and so on, wherein each user message provided by the communication device 20 belongs to a specific communication service such as a real time, a video on demand or each other possible service. The multi-stream capable network protocol implemented in the communication device 20 may further include a service to stream mapper 30, which is adapted to:
i) receive multiple user messages 1 to n of different communication services, as shown in FIG. 1,
ii) detect the communication service the respective user message belongs to, and to
iii) map each received user message in response to the communication service the respective user message belongs to a specific data stream of the multiple-stream capable network protocol.

For the sake of better understanding only three different services are considered in the following illustration, namely a first communication service concerning a real-time communication, a second communication service concerning a video on demand communication and a third communication service concerning an unclassified traffic. The different data streams 1, 2 and 3 according to the preferred embodiment are transferred to the data stream scheduling module 40. If the multi-stream capable network protocol is based on a SCTP protocol, each user message transferred via a SCTP data stream from the service to stream mapper 30 to the stream scheduler will be divided in so-called SCTP chunks, wherein a chunk header is added to each SCTP chunk.

It should be noted that at step ii) the detection of the communication service a user message belongs to can be based on predefined information of the respective user message to be transmitted. The predefined information may include an IP address and/or a port address of the destination device 100, which may for example identify one of the service applications 130, 131, and/or an IP address and/or a port address of the communication device 20 and or a payload information and/or traffic pattern information. Traffic pattern information may describe a bursty transmission. The predefined information of a user message may be included in the SCTP header of each chunk carrying a respective portion of the respective user message.

Each data stream is transferred to the data stream scheduling module 40, wherein multiple data streams carrying multiple user messages, may be transferred simultaneously to the data stream scheduling module 40. The data stream schedule module 40 can perform a multiplexing function 41 in order to multiplex SCTP chunks of at least one data stream into SCTP packets which are then forwarded to the path scheduling module 60. Accordingly, the destination communication device 100 can be configured to perform a de-multiplexing function for de-multiplexing incoming SCTP packets to obtain the SCTP chunks included in each received SCTP packet. Preferably, the de-multiplexing function is implemented in a function module 110.

Preferably during a configuration procedure of communication device 20 a predefined set of classification parameters may be assigned to each communication service of a plurality of communication services, wherein each predefined set includes at least a first classification parameter and at least a second classification parameter.

In the preferred embodiment only three communication services are considered as mentioned above, namely a real-time communication service 1, a video on demand communication service 2 and a third communication service for an unclassified data traffic.

Preferably, the at least one first classification parameter is a priority value, which is used to relatively prioritize each communication service and each data stream, respectively. For example, service 1, which defines the real-time communication, is associated with the highest priority value 1, wherein service 2, which defines a video on demand communication, gets priority value 2 and service 3, which defines an unclassified traffic, is associated with the lowest priority value 3.

The second classification parameters may include a multi-connectivity mode and/or a path selection rule and/or a path order rule. The multi-connectivity mode defines for example a resilience mode and/or an aggregation mode, wherein the resilience mode rules for example a seamless hand over from a primary path to another path if for example the primary path fails. The aggregation mode preferably defines the number of paths, which may be used simultaneously in order to increase the data throughput over the hybrid access network 90. For example, path scheduler 60 may decide to split the first data stream of the multiple-stream network protocol and transmit it over a first communication path through the fixed network 91 and over a second communication path through the wireless network 92 to the destination communication device 100. In this case, the destination communication device 100 is configured to receive the data packets of the first data stream at an interface 101, associated with the fixed network 91, and to receive the data packets of the first data stream at an interface 102 associated with the wireless network 92. It should be note that interfaces 101 and 102 may be implemented as a single interface associated with fixed network 91 and the wireless network 92. In a further step, the communication device 100 may be configured to re-construct the first data stream by re-assembly the data packets received at the interfaces 101 and 102 to form the first data stream, which may be further processed in a predetermined manner.

Now, the operation of the multipath transmission system 10 is described with respect to exemplary scenarios.

It is assumed that communication device 20 is ready for transmitting first data, i.e. a first user message, according to service 1 and second data, i.e. a second user message, according to service 2.

Now, first data belonging to service 1 and second data belonging to service 2 are transferred to service to stream mapper 30. The service to stream mapper 30 is configured to perform a priority detection function 42 in order to detect that the first data belongs to the first communication service, wherein the second data belongs to the second communication service. As a result, the service to stream mapper 30 is now able to map the first data to data stream 1 and the second data to data stream 2, respectively.

By way of example, the service to stream mapper 30 can be configured to manage data stream 1, which transmits the first data in SCTP chunks, wherein a SCTP chunk header is added to each SCTP chunk. The SCTP chunk header of each chunk of data stream 1 may include the data stream number 1, which corresponds to service 1. In a similar manner, the service to stream mapper 30 can manage data stream 2, which transmits the second data in SCTP chunks, wherein a SCTP chunk header is added to each SCTP chunk. The SCTP chunk header of each chunk of data stream 2 may include the data stream number 2, which corresponds to service 2.

Now, the SCTP chunks of the first data stream and the SCTP chunks of the second data stream are transferred to the data stream scheduler 40. The data stream scheduling module 40 is adapted to detect the priority value of each SCTP packet for example by reading the data stream number in the SCTP chunk header of each received SCTP chunk, which correspond to the respective service. In other words, each SCTP chunk which includes the data stream number 1 has the priority value 1 wherein each SCTP chunk including the data stream number 2 has the lower priority value 2. As mentioned above, the data stream scheduling module 40 is configured to multiplex multiple SCTP chunks into SCTP packets. Preferably, the data stream scheduling module 40 firstly multiplexes all SCTP chunks each carrying a portion of the first data into SCTPT packets until the complete first data is processed. Thereafter, data stream scheduling module 40 multiplexes all SCTP chunks each carrying a portion of the second data into SCTPT packets until the complete second data is processed or until new data, which belong to communication service 1 have to be processed.

In particular, SCTP chunks of different data streams, e.g. data streams 1 and 2, can be multiplexed into a common SCTP packet, if it is known, that the individual SCTP chunks of the different data streams are transmitted over the same path. The multiplexing function may be part of the data stream scheduler 40.

Next, each SCTP packet is transferred from data stream scheduler 40 to path scheduling module 60. The path scheduling module 60 is adapted to schedule transmission of the first and second data over the hybrid access network 94 to destination device 100 in response to the at least one second classification parameter of the set of classification parameters assigned to the first and second communication service, respectively.

Preferably, the path scheduling module 60 is configured to perform a detection function 61 in order to detect the communication service the received SCTP packets belong to and read out from memory 22 the respective second classification parameters associated with the detected communication service. Since by way of example each SCTP packet includes the number of data stream it belongs to and the path scheduling module 60 is able to detect the communication service associated with the respective SCTP packet.

As mentioned above, the SCTP packets, which include preferably only first data or second data are now distributed by the path scheduling module 60 to the access interface components 80 and 81 in response to the second classification parameters associated with service 1 and 2, respectively.

According to a preferred embodiment, each SCTP packet is embedded into an IP packet, which may include as a header information the IP address of the communication device 20 and the IP address of the destination device 100. The IP packets are then transferred to access interface components 80 and 81 as scheduled by the path scheduling module 60 and may be transmitted and processed by the communication device 100 as exemplary illustrated above.

Now, a further scenario is illustrated. It is assumed that a multipath connection has been established between the communication device 20 and the communication device 100 using a multi-stream capable network protocol such as SCTP or QUIC. The connection may comprise a first communication path through the fixed network 91 and a second communication path through the wireless network 92.

Furthermore, it is assumed that the path scheduler 60 of the communication device 20 is configured to schedule the transmission of a first data stream to the destination communication device 100 in response to a second classification parameter which defines, for example an aggregation mode. As a result, communication device 20 may split the first data stream and transmit it over the first communication path through the fixed network 91 and over the second communication path through the wireless network 92. In this case, each data packet of the first data stream transmitted over the first communication path carries a respective first path identifier, wherein each data packet of the first data stream transmitted over the second communication path carries a respective second path identifier. Furthermore, the communication device 100 may be configured to interpret the path identifier in each data packet received and to perform under control of a control unit 120 a re-construction function in response to the interpreted path identifiers to re-assemble the received data packets to the first data stream and to further process the first data stream. For example, the step of further processing may comprise the step of forwarding the data packets of the first data stream to the respective destination service application 130 for further use. It should be noted that the re-construction function may be implemented in the function module 110.

In a similar way, all data streams of different communication services received form communication device 20 can be further processed, e.g. forwarded by the communication device 100 to the respective destination service applications, e.g. to a destination service application 131. Of course, a plurality of different service applications may be implemented in the communication device 100. It is noted again that the service application 131 can be alternatively implemented outside of the communication device 100, e.g. in an external application server.

In a further preferred scenario, three data streams 1 to 3 shall be transmitted from communication device 20 to communication device 100. Again it is assumed that a connection has been established between the communication device 20 and the communication device 100 using a multi-stream capable network protocol such as SCTP or QUIC. The connection may comprise a first communication path through the fixed network 91 and a second communication path through the wireless network 92.

Furthermore, it is assumed that a communication service 1 is associated with the resilience mode, priority value 1 and a path selection and path order rule such that a first data stream 1 carrying the communication service 1 is bound preferred over any other communication service and data streams, respectively, to the DSL based access interface component 80. Furthermore, the resilience mode is performed in case that the DSL based access interface component 80 breaks in that the data stream associated with service 1 is transmitted then via LTE based access interface component 81.

For example, communication service 2 may be associated with the aggregation mode, priority value 2 and a path selection and path order rule such that a second data stream 2 carrying to the communication service 2 is transmitted by using both, access interface components 80 and 81 simultaneously, but the usage of DSL access interface component 80 is de-prioritized against first data stream associated with communication service 1.

In addition, communication service 3 can be, for example, associated with the aggregation mode, priority value 3 and a path selection and path order rule such that a third data stream 3 carrying communication service 3 is transmitted by using both access interface components 80 and 81 simultaneously, but the usage of DSL access interface component 80 is de-prioritized against data streams 1 and 2 which are associated with service 1 and 2, respectively.

It should be noted that each data packet of the data streams 1 to 3 may include a respective priority value 1, 2 and 3, respectively. As a result, stream scheduler 40 may be configured to detect the priority value in each data packet by using a priority detection module 42 and to forward the data streams 1 to 3 to the path scheduler 60 in dependence of the detected priority value associated with each data stream. That means for example, that data stream 1 is forwarded first followed by data stream 2 and finally by data stream 3.

In a similar way, module 110 of the destination communication device 100 may be configured to de-multiplex the received data streams 1 to 3 by analyzing first the priority values included in each data packet of the received data streams 1 to 3 and forwarding then the data streams 1 to 3 in the order of their priority value to the respective service application 130, 131.

The above-mentioned predefined sets of classification parameters can be stored in a memory 22 of the communication device 20.

In a preferred embodiment, it is assumed that a connection has been established between the communication device 20 and the communication device 100 using a multi-stream capable network protocol such as SCTP or QUIC. The connection may comprise a first communication path through the fixed network 91 and a second communication path through the wireless network 92.

It is further assumed that the path scheduling module 60 may be configured to monitor, if executed by the communication device 20, for example the quality of the first and second communication paths of the established connection with respect to the communication services supported by the communication device 20. In particular, communication device 20 may be configured to adapt the second classification parameters to the current results of the monitoring procedure. For example, the communication device 20 may change the path order rule associated with the communication service 1 in that the first data stream 1 carrying the communication service 1 is bound preferred to the LTE based access interface component 81 instead of the DSL based access interface component 80.

At least some of the preferred aspects are summarized below.

According to one aspect, a method for transmitting multiple data streams of different communication services over a multipath transmission system 10 is provided, wherein the method comprises the following steps:

a) Assigning to each communication service of a plurality of communication services a predefined set of classification parameters, wherein each predefined set includes at least a first classification parameter and at least a second classification parameter, wherein the at least one first classification parameter of each predefined set is a priority value;

b) providing, at a communication device 20 configured to transmit data traffic to a destination communication device 100, at least first data and second data to be transmitted;

c) detecting a first communication service the first data to be transmitted belongs to and a second communication service the second data belongs to from the plurality of communication services;

d) mapping the first data to a first data stream and the second data to a second data stream in dependence on the first and second communication services detected in step c);

e) scheduling, at a data stream scheduling module 40, the transfer of the first data stream and the second data stream to a path scheduling module 60 in response to the at least one first classification parameter of the set of classification parameters assigned to the first and second communication service, respectively; and f) scheduling, at the path scheduling module 60, the transmission of the first and second data to the destination communication device 100 in response to the at least one second classification parameter of the set of classification parameters assigned to the first and second communication service, respectively.

It should be noted that the at least first data and the second data are preferably distributed by the path scheduling module 60 on a per packet basis, wherein the packets may be configured as IP-packets.

It should be noted that step d) may comprise the step of inserting into each IP packet carrying the first data a respective first data stream identifier and of inserting into each IP packet carrying the second data a respective second data stream identifier.

It should be noted that step e) may comprise the step of inserting into each IP packet carrying the first data a respective first priority value assigned to the first communication service and of inserting into each IP packet carrying the second data a respective second priority value assigned to the second communication service.

A communication service according to the present invention may be for example a real time service, a video on demand service or any other communication service. A real time communication service may be for example a video conference service.

Preferably, a connection or communication session comprising at least two communication paths is established between the communication device 20 and the destination communication device 100 using a multi-stream capable network protocol, and wherein step f) comprises the step of transmitting the first data stream including the first data and the second data stream including the second data over at least one of the at least two communication paths from the communication device 20 to the destination communication device 100. Preferably, the connection is established via a hybrid access network 90.

It should be noted that the multi-stream capable network protocol is preferably a layer 4 network protocol within the ISO OSI reference model.

Preferably, the first and second data streams transmitted in step f) are each received and processed by the destination communication device 100 terminating the established connection. If, for example, the path scheduling module 60 has decided to transmit the first data stream over more than one communication paths, then first data stream will be processed, i.e. re-construct by the destination communication device 100 respectively. To allow this each data packet carrying data of the first and second data stream further includes a data stream identifier and a data stream specific multipath information indicating in particular the path or the paths of the connection the respective data stream is to be transmitted.

According to a preferred embodiment, the priority values of each predefined set differs from each other or the priority values of at least two predefined sets of classification parameters are identical, and wherein the at least one second classification parameter of each predefined set of classification parameters comprises a multi connectivity mode and/or a path selection rule and/or a path order rule.

It should be noted that the predefined sets of classification parameters differ from each other in at least one classification parameter.

A multi connectivity mode may define for example a resilience mode or an aggregation mode with respect to a specific communication service, wherein each multi connectivity mode may define the number of paths to be simultaneously used for transmitting service dependent data over the multipath transmission system 10. An aggregation mode may be used to enhance the data throughput by using multiple paths simultaneously for transmitting service dependent data thereon. A resilience mode may enhance the reliability of service dependent data transmission in that a predefined auxiliary path is used in case that a primary path breaks.

Preferably, steps e) and f) are based on a multi-stream capable network protocol such as the Stream Control Transmission Protocol (SCTP) according to the standard RFC 4960 or a QUIC network protocol which is described for example at https://datatracker.ietforg/doc/draft-ietf-quic-transport/. When using a Stream Control Transmission protocol each service dependent data stream is divided into so-called chunks, i.e. data stream segments, which in turn are forwarded to the data stream scheduling module. The data stream scheduling module is configured to generate SCTP packets each including at least one chunk of at least one selected data stream.

Preferably, at step c) the detection of the first communication service is based on predefined information of the first data to be transmitted and to the detection of the second communication service is based on predefined information of the second data to be transmitted, wherein the predefined information includes an IP address and/or a port address of the destination device and/or and an IP address and/or a port address of the communication device and/or payload information and/or traffic pattern information.

Preferably, the first and second data streams transmitted in step f) are each received and processed by the destination communication device 100.

In particular, the step of processing the first and second data streams may comprise the steps of:
  re-constructing the first data stream, if the first data stream has been transmitted via the at least two communication paths, and
  re-constructing the second data stream, if the second data stream has been transmitted via the at least two communication paths.

In addition, the first and second data streams may be processed in an order defined by the priority values associated with the first and second communication services.

According to a preferred embodiment, the method may further comprise the steps of:
  monitoring the at least two communication paths with respect to each communication service of step a), and
  changing or re-adjusting the at least one second classification parameter assigned, at step a), to each communication service in dependence of the result of the monitoring step, e.g. in dependence of the current quality of the at least two communication paths measured during the monitoring step. Preferably, the at least one second classification of each predefined set or of at least one of the predefined set may be re-adjusted whenever the quality of the at least two communication paths changes.

According to a further exemplary aspect, a communication device 20 for transmitting multiple data streams of different communication services according to a multi-stream capable network protocol to a destination communication device 100 is provided. The communication device 20 may comprise:
  a first storage 22 configured to store a plurality of predefined sets of classification parameters, wherein each predefined set includes at least a first classification parameter and
  at least a second classification parameter,
  a second storage 23 configured to store a program including a plurality of instructions,
  a control unit 21 configured to execute the program thereby causing the communication device to carry out the method as set forth above, and
  at least two access interfaces 80 and 81, each access interface belonging to at least one communication path and being connected to the path scheduling module 60. The access interfaces 80 and 81 may be network interface cards.

Preferably, the access interfaces 80 is configured to be connected to a fixed access network 91, wherein the other access interface 81 is configured to be connected to a wireless access network 92.

Last but not least, it should be noted that the service to stream mapper 30, the data stream scheduling module and the path scheduling module 60 are realized by hardware and/or software components.

According to a further exemplary aspect a method for transmitting multiple data streams of different communication services over a multipath transmission system is provided, which comprises the following steps:
  a) assigning to each communication service of a plurality of communication services a predefined set of classification parameters, wherein each predefined set includes at least a first classification parameter and at least a second classification parameter, wherein the at least one first classification parameter of each predefined set is a priority value;
  b) providing, at a communication device configured to transmit data traffic over the multipath transmission system, at least first data and second data to be transmitted;
  c) detecting a first communication service the first data to be transmitted belongs to and a second communication service the second data belongs to from the plurality of communication services;
  d) mapping the first data to a first data stream and the second data to a second data stream in dependence on the first and second communication services detected in step c);
  e) scheduling, at a data stream scheduling module, the transfer of the first data stream and the second data stream to a path scheduling module in response to the at least one first classification parameter of the set of classification parameters assigned to the first and second communication service, respectively; and
  f) scheduling, at the path scheduling module, the transmission of the first and second data over the multipath transmission system to a destination device connected to the multipath transmission system in response to the at least one second classification parameter of the set of classification parameters assigned to the first and second communication service, respectively.

Preferably, the priority value of each predefined set of classification parameters differs from each other or wherein the priority values of at least two predefined sets of classification parameters are identical, and wherein the at least one second classification parameter of each predefined set of classification parameters comprises a multi-connectivity mode and/or a path selection rule and/or a path order rule, wherein the multi-connectivity mode defines the number of different paths to be simultaneously used for transmitting a respective data stream over the multipath transmission system.

Preferably, steps e) and f) are based on a multi-stream transmission protocol.

The multi-stream transmission protocol may be based on a Stream Control Transmission Protocol (SCTP) or a MP-QUIC network protocol.

The first data and second data may be transmitted via IP packets.

Preferably, the detection of the first communication service at step c) may be based on predefined information of the first data to be transmitted and the detection of the second communication service is based on predefined information of the second data to be transmitted, wherein the predefined information includes an IP address and/or a port address of the destination device and/or an IP address and/or a port address of the communication device and/or payload information and/or traffic pattern information.

According to a still further exemplary aspect a communication device 20 for transmitting multiple data streams of different communication services over a multipath transmission system 10 is provided, which may comprise:
  a first storage 22 configured to store a plurality of predefined sets of classification parameters, wherein each predefined set includes at least a first classification parameter and
  at least a second classification parameter,
  a second storage 23 configured to store a program including a plurality of instructions,
  at least two access interfaces 80, 81, each access interface defining at least one path, and a control unit configured to execute the program thereby causing the communication device 20 to carry out the above mentioned method.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for transmitting multiple data streams of different communication services over a multipath transmission system, wherein the method comprises the following steps:
   a) assigning to each communication service of a plurality of communication services a predefined set of classification parameters, wherein each predefined set of classification parameters comprises a first classification parameter and at least one second classification parameter, wherein the first classification parameter is a priority value;
   b) providing, at a communication device configured to transmit data traffic to a destination communication device, data to be transmitted, wherein the data to be transmitted comprises first data and second data;
   c) detecting, out of the plurality of communication services, a first communication service the first data belongs to and a second communication service the second data belongs to;
   d) mapping, by the communication device, the first data to a first data stream and the second data to a second data stream based on the first and second detected communication services;
   e) scheduling, by a data stream scheduler of the communication device, transfer of the first data stream and the second data stream from the data stream scheduler to a path scheduler of the communication device based on the first classification parameter assigned to the first communication service and the first classification parameter assigned to the second communication service; and
   f) subsequent to step e), scheduling, by the path scheduler of the communication device, transmission of the first data and the second data to the destination communication device based on the at least one second classification parameter assigned to the first communication service and the at least one second classification parameter assigned to the second communication service;
   wherein the at least one second classification parameter of each predefined set of classification parameters comprises:
      a multi-connectivity mode, wherein the multi-connectivity mode defines the number of different paths to be simultaneously used for transmitting a respective data stream over the multipath transmission system,
      a path selection rule; and/or
      a path order rule;
   wherein step e) and/or step f) is based on a multi-stream capable network protocol which comprises the data stream scheduler and the path scheduler, wherein the multi-stream capable transmission protocol is based on a Stream Control Transmission Protocol (SCTP) or a Quick UDP Internet Connections (QUIC) network protocol.

2. The method of claim 1, wherein a connection comprising at least two communication paths is established between the communication device and the destination communication device using a multi-stream capable network protocol, and
   wherein step f) comprises transmitting the first data stream including the first data and the second data stream including the second data over at least one of the at least two communication paths from the communication device to the destination communication device.

3. The method of claim 2, wherein the connection is established over a hybrid access network.

4. The method of claim 1, wherein at step c) the detection of the first communication service is based on predefined information of the first data and the detection of the second communication service is based on predefined information of the second data, wherein the predefined information includes:
   an IP address and/or a port address of the destination device;
   an IP address and/or a port address of the communication device;
   payload information; and/or
   traffic pattern information.

5. The method of claim 1, wherein the first data of the first data stream and the second data of the second data stream are transmitted via IP packets.

6. The method of claim 2, wherein the first and second data streams transmitted in step f) are each received and processed by the destination communication device.

7. The method of claim 6, wherein processing the first and second data streams comprises:
   re-constructing the first data stream based on the first data stream having been transmitted via the at least two communication paths; or
   re-constructing the second data stream based on the second data stream having been transmitted via the at least two communication paths.

8. The method of claim 6, wherein the first and second data streams are processed in an order based on the priority values associated with the first and second communication services.

9. The method of claim 2, further comprising:
   monitoring the at least two communication paths with respect to each communication service of step a); and changing the at least one second classification parameter assigned at step a) to each communication service based on a result of the monitoring step.

10. A communication device for transmitting multiple data streams of different communication services according to a multi-stream capable network protocol, comprising:
a first storage configured to store a plurality of predefined sets of classification parameters;
a second storage configured to store a program including a plurality of instructions;
at least two access interfaces, each access interface corresponding to at least one path; and
a processor configured to execute the program to facilitate the following being performed by the communication device:
a) assigning to each communication service of a plurality of communication services a predefined set of classification parameters, wherein each predefined set of classification parameters comprises a first classification parameter and at least one second classification parameter, wherein the first classification parameter is a priority value;
b) providing data to be transmitted, wherein the data to be transmitted comprises first data and second data;
c) detecting, out of the plurality of communication services, a first communication service the first data belongs to and a second communication service the second data belongs to;
d) mapping, by the communication device, the first data to a first data stream and the second data to a second data stream based on the first and second detected communication services;
e) scheduling, by a data stream scheduler of the communication device, transfer of the first data stream and the second data stream from the data stream scheduler to a path scheduler of the communication device based on the first classification parameter assigned to the first communication service and the first classification parameter assigned to the second communication service; and
f) subsequent to step e), scheduling, by the path scheduler of the communication device, transmission of the first data and the second data to a destination communication device based on the at least one second classification parameter assigned to the first communication service and the at least one second classification parameter assigned to the second communication service;
wherein the at least one second classification parameter of each predefined set of classification parameters comprises:
a multi-connectivity mode, wherein the multi-connectivity mode defines the number of different paths to be simultaneously used for transmitting a respective data stream over the multipath transmission system;
a path selection rule; and/or
a path order rule;
wherein step e) and/or step f) is based on a multi-stream capable network protocol which comprises the data stream scheduler and the path scheduler, wherein the multi-stream capable transmission protocol is based on a Stream Control Transmission Protocol (SCTP) or a Quick UDP Internet Connections (QUIC) network protocol.

11. The communication device of claim 10, wherein one access interface of the at least two access interfaces is configured to be connected to a fixed access network, and wherein another access interface of the at least two access interfaces is configured to be connected to a wireless access network.

12. The method of claim 1, wherein step e) corresponds to priority-based scheduling and step f) corresponds to path selection scheduling.

* * * * *